United States Patent
Tseng

[19]

[11] Patent Number: 5,938,379
[45] Date of Patent: Aug. 17, 1999

[54] COUNTERSINK REAMER FOR THREE-DIMENSIONAL INTERIOR/EXTERIOR RIMS OF A SMALL BORE

[76] Inventor: Shao-Chien Tseng, No.130, Sec 2. Yang-Shin Rd., Yang-Mei, Taoyuan 326, Taiwan

[21] Appl. No.: 09/069,876

[22] Filed: Apr. 29, 1998

[51] Int. Cl.$^6$ .................................................. B23B 51/00
[52] U.S. Cl. ........................................... 408/199; 451/495
[58] Field of Search .................................. 451/495, 504, 451/506; 408/199, 227, 156, 231

[56] References Cited

U.S. PATENT DOCUMENTS

| | | | |
|---|---|---|---|
| 2,732,612 | 1/1956 | Hallock | 408/227 |
| 2,811,187 | 10/1957 | Loam et al. | 408/227 |
| 3,917,429 | 11/1975 | Ertley | 408/227 |
| 4,473,070 | 9/1984 | Matthews et al. | 408/227 |
| 5,158,405 | 10/1992 | Serafin | 408/199 |
| 5,297,905 | 3/1994 | Schmidt et al. | 408/199 |
| 5,658,103 | 8/1997 | Inokuchi et al. | 408/199 |

*Primary Examiner*—Andrea L. Pitts
*Assistant Examiner*—Adesh Bhargava
*Attorney, Agent, or Firm*—Pro-Techtor International Services

[57] ABSTRACT

A countersink reamer for three dimensional interior/exterior small bores, being comprised mainly of a plurality of O rings, piano wires and an electric or pneumatic hand tool with a claw and rotatable to provide moving power; the piano wires are arranged in a bundle, the front end thereof are welded and fixed, and their rear end are welded to a cylindrical seat, those of the piano wires not welded are fitted over with several O rings, the bundle of piano wires connected to the cylindrical seat is inserted to be mounted on the claw of the electric or pneumatic hand tool; so that rough edges resulted on both the interior and the exterior bore rims of a small rough bore on a normal workpiece can be synchronically abraded and countersink-reamed by swivelling grinding and cutting action of the piano wires which are rotating after having been inserted into the bore with the O rings abutting against the wall of the bore and been activated for rotation. The present invention can exactly overcome the technical impediments ineliminable in the conventional techniques in abrasing rough edges created on and countersink-reaming on the three dimensional interior/exterior small bores.

6 Claims, 5 Drawing Sheets

COUNTERSINK REAMER FOR THREE-DIMENSIONAL INTERIOR/EXTERIOR RIMS OF A SMALL BORE

BACKGROUND OF THE INVENTION

1. Field of the Invention

The present invention relates to a countersink reamer for three dimensional interior/exterior small bores, and especially to a countersink reamer which can be easily locked on a conventional general electric (or pneumatic) hand tool for simple and fast abrasing rough edges in one way (or in both ways) on small bores drilled on a two-dimensional plane or a three-dimensional arciform surface on a normal workpiece, and especially for abrasing rough edges created on the three dimensional interior/exterior small bores when in drilling and by the way for countersink-reaming.

2. Description of the Prior Art

In a mechanical processing, generally, it is most convenient to use a drilling technique to get a straight bore with a small diameter in manufacturing.

Such shaped small bores made in a drilling processing technique, particularly those interior/exterior small bore rims on such bores, exceptionally tend to create rough edges; the rough edges on the bore rims will be the impediments of the assembling members to be fitted over or tapped, thereby, the accuracy of assembling can be adversely influenced; and therefore, the rough edges on the interior/exterior bore rims must be gotton rid of by grinding and cutting processes.

It has been known that, the way of getting rid of the rough edges on the interior/exterior bore rims mostly uses sand wheels or sponge wheels for grinding, and some may use a vibrational grinding process to eliminate the rough edges on the bore rims; however, sand wheels and sponge wheels for grinding can only be used to eliminate the rough edges on the exterior bore rims on a two-dimensional plane, they can not be placed in the areas allowing them to eliminate the rough edges on the interior walls of the bores, or on the interior bore rims on a two-dimensional plane or even on a three-dimensional arciform surface, these rough edges appear in a narrow and small bore, on a wall at a distal end or in a corner, or in an enclosed pipe hole, and neither the vibrational grinding processes using grinding media and grinding granules can eliminate the rough edges on the interior walls of the bores, or on the interior bore rims on a two-dimensional plane or on a three-dimensional arciform surface in these narrow environments. Therefore, non of the conventional techniques are suitable for synchronical grinding and countersink-reaming the rough edges on the interior/exterior bore rims, specially those rough edges on the three dimensional interior/exterior small bores drilled on the three dimensional arciform surfaces, these are the technical impediments ineliminable in the conventional techniques.

SUMMARY OF THE INVENTION

In view of the above stated background, the conventional grinding and cutting techniques are hardly able of synchronical grinding and countersink-reaming the rough edges on the interior/exterior bore rims of the small bores, and not mentioning those rough edges on the interior/exterior bore rims of the small bores on a three-dimensional arciform surface. Such troubles in the processing techniques gave the present invention the motive of study and invention, however:

The object of the present invention is to provide a countersink reamer for three-dimensional interior/exterior small bores, the countersink reamer can be easily mounted on a general electric (or pneumatic) hand tool or a mechanical claw, and is inserted into a small bore, when it is activated, it can do synchronical abrasing and eliminating of rough edges on a two-dimensional or a three-dimensional small bore, so that delicacy of the small bore and convenience of processing thereof can be improved.

To achieve the above stated object, the technical measure used in the present invention is mainly to choose a set of piano wires having flexibility, hardness and stiffness suitable for grinding and cutting as a tool on the countersink reamer for grinding and cutting processing on the rough edges of the small bore; the piano wires are arranged in a bundle, both ends thereof are welded and fixed, and can be easily mounted on a claw on an electric (or pneumatic) hand tool and is locked thereon; the bundle of piano wires can be fitted thereover with a plurality of O rings depending on the requirement of the processing environment of the bore; with this, the bundle of piano wires can be inserted into any small bore on a two-dimensional plane or on a three-dimensional arciform surface, the O rings are abutted on the inner wall of the bore to render two portions of the bundle piano wires with suitable lengths respectively to extend beyond the interior/exterior bore rims of the small bores, then the electric (or pneumatic) hand tool is activated to make revolving of the piano wires, so that all piano wires can create centrifugal force to generate a swivelling wiping action with the same radian, to thereby grind and cut the rough edges on a two-dimensional or a three-dimensional small bore, the radian of the piano wires in such swivelling wiping action can be increased by increasing the rotational speed of the electric (or pneumatic) hand tool, and thus the countersink-reaming operation can be proceed synchronically when the rough edges are eliminated.

The present invention will be apparent after reading the detailed description of the preferred embodiment thereof in reference to the accompanying drawings.

DETAILED DESCRIPTION OF THE PREFERRED EMBODIMENT

A small bore 5 drilled on a pipe shaped workpiece 6 and having a three-dimensional arciform wall is now taken as an object to be processed, in order to explain using and the improved efficiency of the countersink reamer provided in the present invention for three-dimensional interior/exterior small bores.

Figure 1:
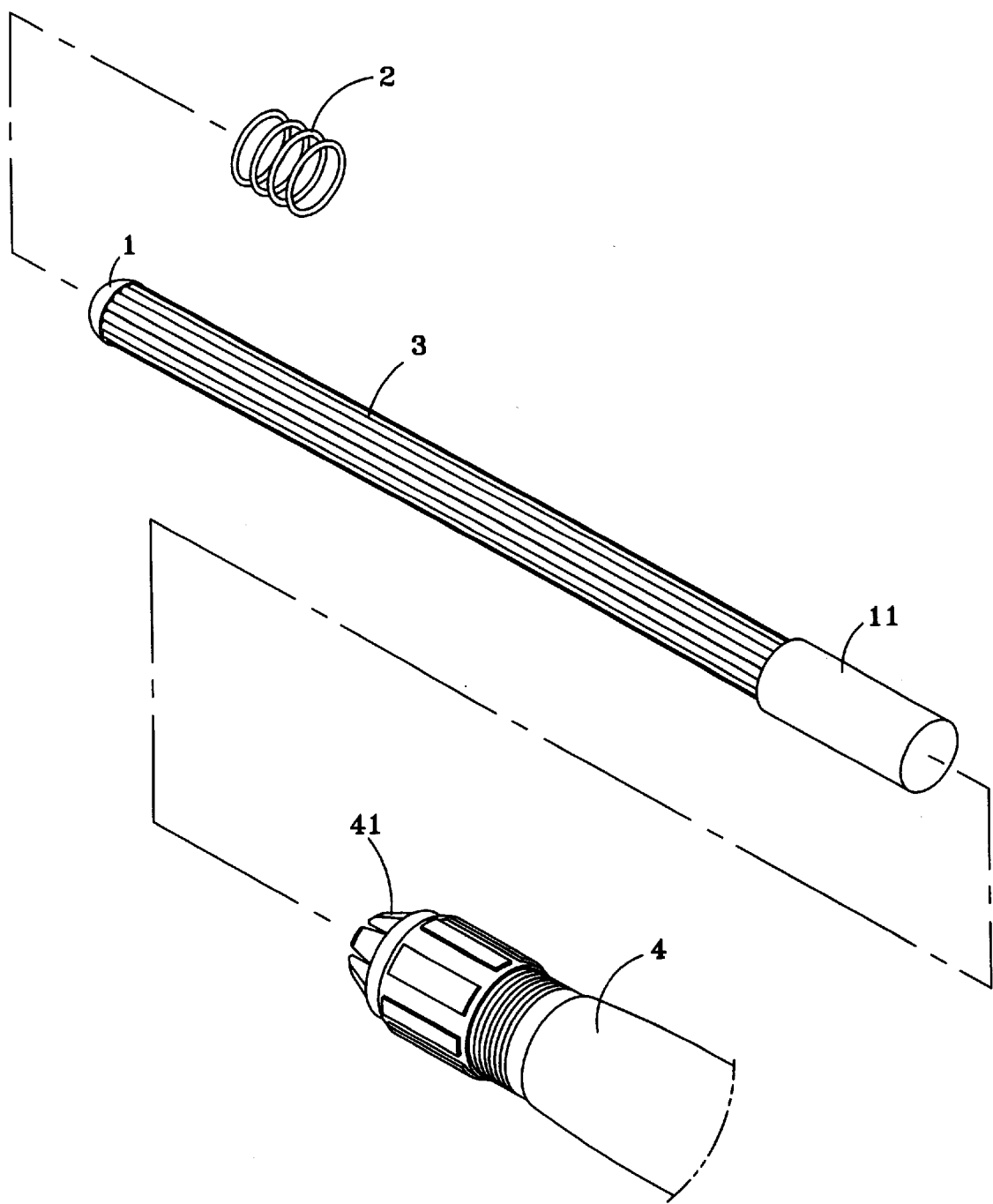
FIG. 1 is an analytic perspective view of the present invention.

It can be seen clearly from FIG. 1 that the present invention is comprised of a plurality of O rings 2, a plurality of piano wires 3 and an electric (or pneumatic) hand tool 4 with a claw 41 and rotatable to provide moving power, wherein:

The O rings 2 are made of polyurethane and abrasion resistive, but can be substituted by annular plastic covers.

Figure 2:
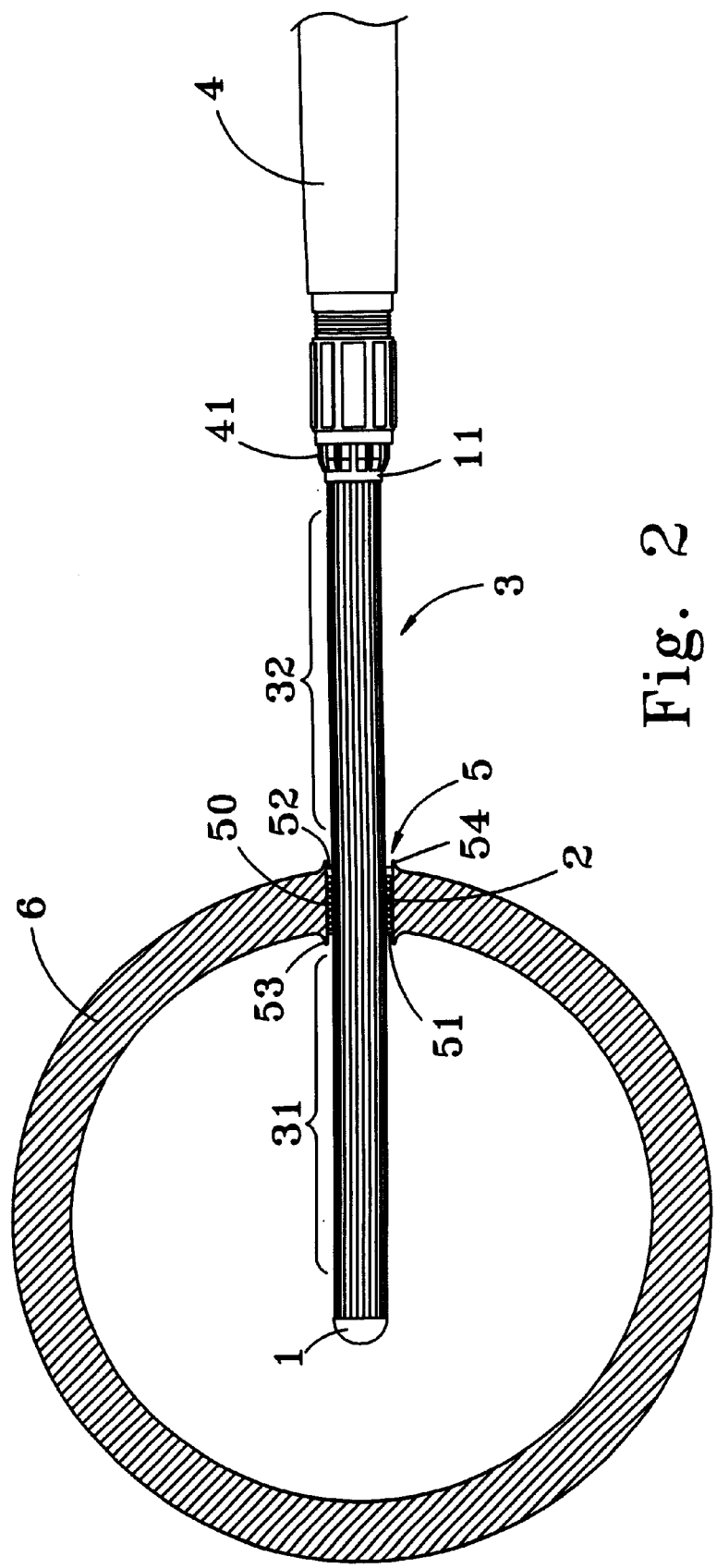
FIG. 2 is a schematic view showing the countersink reamer of the present invention is inserted into a small bore before operation.

The piano wires 3 are arranged in a bundle, the front end thereof are welded and fixed to form a welded connection 1, and the rear end thereof can be welded and connected to a cylindrical seat 11; the cylindrical seat 11 can be easily mounted on a claw 41 on an electric (or pneumatic) hand tool 4, so that the hand tool 4 can steadily make the bundle of piano wires 3 rotate; the piano wires 3 all are flexible and provided with hardness for cutting, so that they can be used to grind and cut the rough edges 53 and 54 on a three-dimensional interior bore rim 51 and a three-dimensional exterior bore rim 52 (referring to FIGS. 1 and 2).

The bundle of piano wires 3 can be fitted over with one or more than one O rings 2 (or plastic covers) depending on the requirement of the processing environment of the bore, so that the bundle of piano wires 3 is divided into a front section 31 and a rear section 32 by the O rings 2 (or plastic covers); the O rings 2 (or plastic covers) are used to abut and protect the inner wall 50 of the bore 5 drilled on the workpiece 6, normally, the thickness of the pile of the O rings 2 is smaller than the depth of the bore 5 to be ground and cut in order that the O rings 2 can be placed in the central area of the inner wall 50, and allow the rough edges 53 and 54 on the three-dimensional interior bore rim 51 and the three-dimensional exterior bore rim 52 to be exposed (referring to FIG. 2).

The whole diameter of the bundle of piano wires 3 and the welded connection 1 on the front end thereof must be smaller than the inner diameter of the bore 5 to be ground and cut, in order that in insertion mounting, the bundle of piano wires 3 can be placed into and extended out of the bore 5 (referring to FIG. 2).

The electric (or pneumatic) hand tool 4 is a common hand tool which is loaded with a power source—a motor or which is pushable by air pressure to generate rotation, such as is a power motor or a pneumatic powered fan normally mounted in a grasp, or an electric (or pneumatic) hand tool allowing the claw 41 thereon to randomly assemble and disassemble and can be changed with various screw driver bits; the present invention uses such hand tool 4 capable of putting out rotation power and having the bundle of piano wires 3 mounted in the cylindrical seat 11 and inside the claw 41, thus the countersink reamer is completed.

Figure 3:
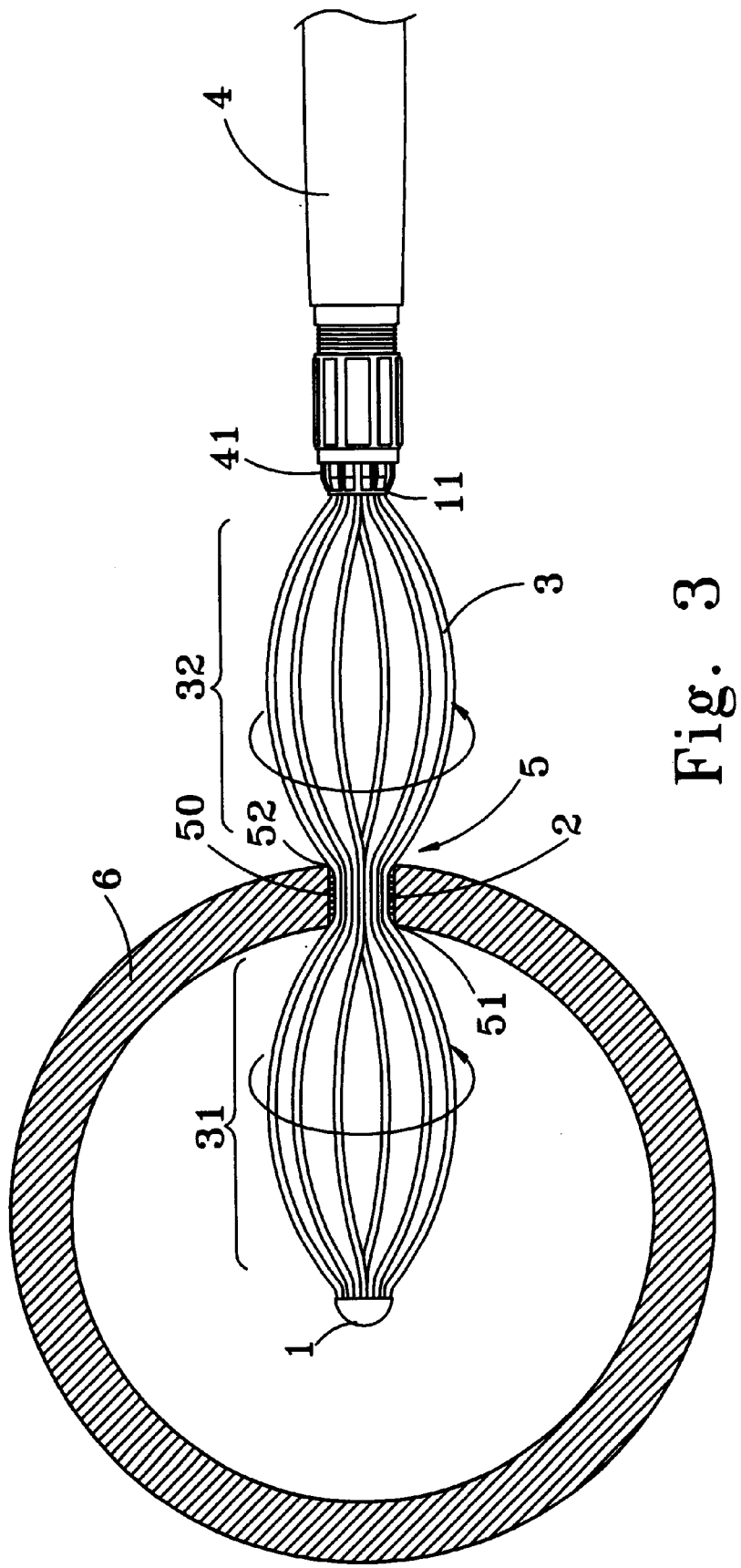
FIG. 3 is a schematic view showing the countersink reamer of the present invention is activated to grind, cut and ream the interior/exterior bore rims on a three-dimensional small bore.

By the countersink reamer composed of the above stated members, bores 5 drilled on the workpiece 6 having a three-dimensional arciform surface can be ground and cut, the countersink reamer is specically suitable for small bores 5 for abrading the rough edges on the three-dimensional interior bore rim 51 and the three-dimensional exterior bore rim 52 on the two ends of the bores 5; and before activating the turning-on switch of the hand tool 4 of the countersink reamer, the piano wires 3 must be placed in a bore 5, and a plurality of O rings 2 must be fitted on and protect the inner wall 50 of the bore 5 and allow exposure of the rough edges 53 and 54 on the three-dimensional interior bore rim 51 and the three-dimensional exterior bore rim 52, the front section 31 and the rear section 32 of the bundle of the piano wires 3 are exposed respectively to the interior of the interior bore rim 51 and to the exterior of the exterior bore rim 52 (referring to FIG. 2), the hand tool 4 is then activated, so that the front section 31 and the rear section 32 of the bundle of piano wires 3 at the two sides of the O rings 2 create respectively a swivelling wiping action with the same radian respectively in the interior of the inside bore rim 51 and at the outside of the exterior bore rim 52, and thus form respectively a grinding and cutting action, so that the rough edges 53 and 54 on the three-dimensional interior bore rim 51 and the three-dimensional exterior bore rim 52 can be eliminated synchronically, yet a countersink-reaming action can also be synchronically conducted (such as is shown in FIG. 3), therefore, the technical impediment in grinding and countersink reaming for the rough edges on a three-dimensional small bore can be overcome.

Figure 4:
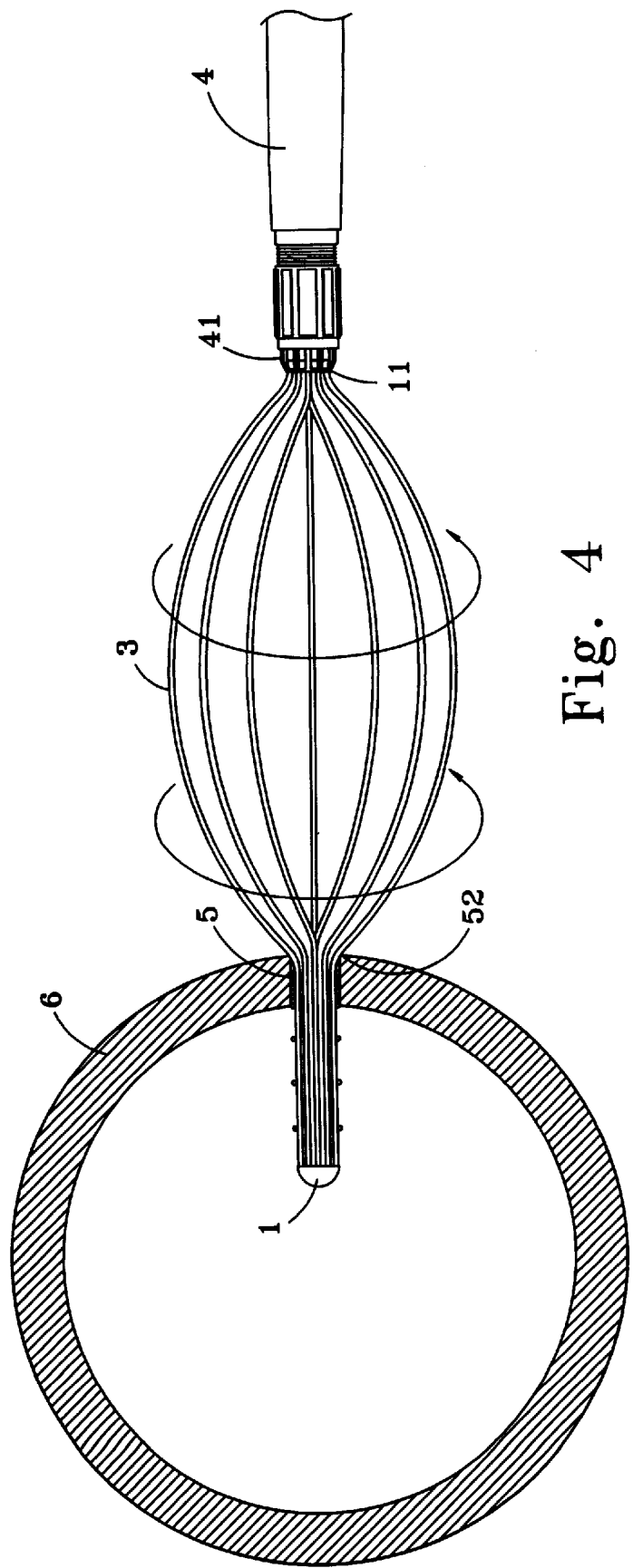
FIG. 4 is a schematic view showing the countersink reamer of the present invention grinds and cuts an exterior bore rim on a three-dimensional small bore.

Moreover, the O rings 2 on the piano wires 3 can be moved to the welded connection 1 on the front end thereof, so that the piano wires 3 can be used to grind the three-dimensional exterior bore rim 52 on one side of the bore 5 (such as is shown in FIG. 4).

Figure 5:
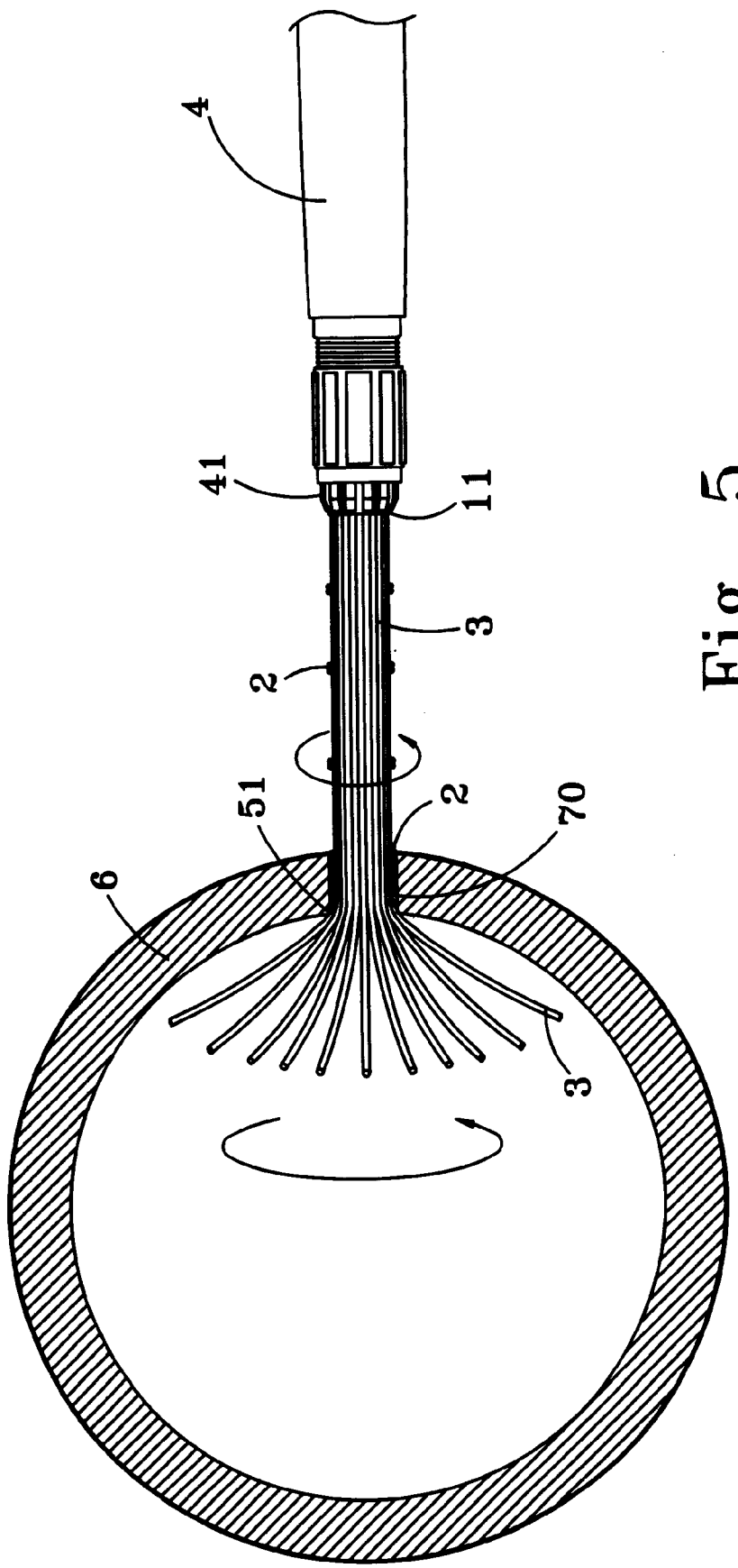
FIG. 5 is a schematic view showing the countersink reamer of the present invention grinds and cuts an interior bore rim on a three-dimensional small bore.

And further, the front end of the bundle of piano wires 3 does not have to be welded for fixing, in fact, the rear end of the bundle of piano wires 3 has already been welded to the cylindrical seat 11, an effect of loosening-proof has been obtained, so that the front end of the bundle does not have to be welded for fixing, it is therefore a free end; a plurality of O rings 2 can be provided on the bundle of piano wires 3 to be specifically used to grind the rough edges on the three-dimensional interior bore rim 51 (such as is shown in FIG. 5), the wires on the front end not being welded generate scraping and gringding action due to their free stretching and swivelling by the centrifugal force created in rotation, thereby, they can be used to treat especially the rough edges on such three-dimensional interior bore rims 51 as generally having arciform surfaces (such as is shown in FIG. 5) for countersink-remeaming.

Accordingly, the countersink reamer made from the piano wires 3 of the present invention can be used to grind a single interior bore rim, an exterior bore rim or both an interior bore rim and an exterior bore rim; and especially for those workpieces having three-dimensional surfaces, when bores are drilled on their surfaces (such as those bores drilled on the walls of pipes), the interior and the exterior bore rims thereof have the contours of three-dimensional curvatures, and use of the centrifugal rotational grinding countersink reamer of the present invention can exactly overcome the technical impediments ineliminable in the conventional techniques in grinding such three-dimensional bore.

Further, the piano wires 3 of the present invention in the shape of bundles can not only be mounted and locked in a claw 41 of an electric (or pneumatic) hand tool 4, in fact, under the requirement of steadiness and accuracy of grinding, the piano wires 3 can also be mounted and locked in a drilling machine, a milling machine or other automation machines for grinding rough interior and exterior bore rims by rotation; therefore, the present invention is widely available, and can get the double effect of abrasing rough edges and countersink-remeaming easily, it is no more a hard or time consuming work to abrade the rough edges on both the interior and exterior bore rims of a plurality of rough bores 5 having small diameters, convenience, practicality as well as improveness of the present invention thus are provided.

Having thus described my invention, what I claim as new and desire to be secured by Letters Patent of the United States are:

1. A countersink reamer for three dimensional interior/exterior small bores comprising:

at least one O-ring, a plurality of piano wires, and a rotation means; wherein said piano wires are arranged in a bundle, front ends of said piano wires are fixed together, and rear ends of said piano wires are connected to a cylindrical seat, said at least one O-ring is fitted over a central portion of said bundle of piano wires, said bundle of piano wires connected to said cylindrical seat is mounted in said rotation means and rotated after said bundle of piano wires is positioned in a three-dimensional small rough bore with said at least one O-ring abutting a wall of the bore so that rough edges on both an interior bore rim and an exterior bore rim of the bore on a normal workpiece can be abraded and countersink-reamed by a swivelling, grinding, and cutting action of said bundle of piano wires.

2. The countersink reamer for three dimensional interior/exterior small bores as defined in claim 1 wherein:

said at least one O-ring is movable to adjust sections of swivelling of said bundle of piano wires, thereby adjusting the ranges of grinding of the bore rims.

3. The countersink reamer for three dimensional interior/exterior small bores as defined in claim 1 wherein:

said bundle of piano wires abrades and countersink-reams the rough edges on the interior/exterior small bores on two sides simultaneously.

4. A countersink reamer for three dimensional interior/exterior small bores comprising:

at least one O-ring, a plurality of piano wires, and a rotation means; wherein said piano wires are arranged in a bundle, rear ends of said piano wires are connected to a cylindrical seat, said at least one O-ring is fitted over a central portion of said bundle of piano wires, said bundle of piano wires connected to said cylindrical seat is mounted in said rotation means and rotated after said bundle of piano wires is positioned in a three-dimensional small rough bore with said at least one O-ring abutting a wall of the bore so that rough edges on both an interior bore rim and an exterior bore rim of the bore on a normal workpiece can be abraded and countersink-reamed by a swivelling, grinding, and cutting action of said bundle of piano wires.

5. The countersink reamer for three dimensional interior/exterior small bores as defined in claim 4 wherein:

said at least one O-ring is movable to adjust sections of swivelling of said bundle of piano wires, thereby adjusting the ranges of grinding of the bore rims.

6. The countersink reamer for three dimensional interior/exterior small bores as defined in claim 4 wherein:

said bundle of piano wires abrades and countersink-reams the rough edges on the interior/exterior small bores on two sides simultaneously.

\* \* \* \* \*